(12) United States Patent
Pelcak et al.

(10) Patent No.: US 7,352,563 B2
(45) Date of Patent: Apr. 1, 2008

(54) CAPACITOR ASSEMBLY

(75) Inventors: Jaromir Pelcak, Uherske Hradiste (CZ); Tomas Zednicek, Lanskroun (CZ); Stansilav Zednicek, Lanskroun (CZ); Ales Vyroubal, Postrelmov (CZ)

(73) Assignee: AVX Corporation, Myrtle Beach, SC (US)

( * ) Notice: Subject to any disclaimer, the term of this patent is extended or adjusted under 35 U.S.C. 154(b) by 0 days.

(21) Appl. No.: 11/602,473

(22) Filed: Nov. 20, 2006

(65) Prior Publication Data

US 2007/0211414 A1    Sep. 13, 2007

Related U.S. Application Data

(60) Provisional application No. 60/781,633, filed on Mar. 13, 2006.

(51) Int. Cl.
*H01G 5/38*   (2006.01)
*H01G 9/00*   (2006.01)

(52) U.S. Cl. .................. 361/541; 361/522; 361/329

(58) Field of Classification Search .............. 361/523, 361/528, 532–540, 541, 522, 328–330; 29/25.03
See application file for complete search history.

(56) References Cited

U.S. PATENT DOCUMENTS

| | | | |
|---|---|---|---|
| 4,085,435 A | 4/1978 | Galvagni | |
| 4,945,452 A | 7/1990 | Sturmer et al. | |
| 5,007,149 A * | 4/1991 | Schnabel | 29/25.03 |
| 5,198,968 A | 3/1993 | Galvagni | |
| 5,266,079 A * | 11/1993 | Iga | 29/25.03 |
| 5,357,399 A | 10/1994 | Salisbury | |
| 5,394,295 A | 2/1995 | Galvagni et al. | |
| 5,495,386 A | 2/1996 | Kulkarn | |
| 5,504,647 A * | 4/1996 | Kuriyama | 361/534 |
| 5,973,907 A | 10/1999 | Reed | |
| 6,197,252 B1 | 3/2001 | Bishop et al. | |
| 6,322,912 B1 | 11/2001 | Fife | |
| 6,674,635 B1 | 1/2004 | Fife et al. | |
| 6,757,152 B2 | 6/2004 | Galvagni et al. | |
| 6,816,358 B2 * | 11/2004 | Kida et al. | 361/540 |

(Continued)

FOREIGN PATENT DOCUMENTS

EP    0901137 A2    3/1999

(Continued)

OTHER PUBLICATIONS

Great Britain Search Report for GB0704747.5, 2 pages, Jul. 5, 2007.

(Continued)

*Primary Examiner*—Eric Thomas
(74) *Attorney, Agent, or Firm*—Dority & Manning, P.A.

(57) ABSTRACT

An integrated capacitor assembly that offers improved performance characteristics in a convenient and space-saving package is provided. More specifically, the capacitor assembly contains a multi-anode stack of at least two electrolytic capacitors and at least one ceramic component, which are connected in parallel to common terminals within an encapsulating case. The resultant capacitor assembly is characterized by such performance characteristics as relatively high capacitance, low ESR, low piezoelectric noise, and space reduction. Reduced piezoelectric noise may be particularly advantageous for providing clear filtering in audio/video data processing and communication.

24 Claims, 8 Drawing Sheets

U.S. PATENT DOCUMENTS

| | | |
|---|---|---|
| 6,967,829 B2 | 11/2005 | Seitz et al. |
| 7,054,136 B2 | 5/2006 | Ritter et al. |
| 7,068,490 B2 | 6/2006 | Prymak |
| 7,133,275 B2 | 11/2006 | Purple et al. |
| 7,190,571 B2 | 3/2007 | Heusmann et al. |

FOREIGN PATENT DOCUMENTS

| | | | |
|---|---|---|---|
| EP | 0901137 A3 | | 3/1999 |
| JP | 62073610 A | * | 4/1987 |
| JP | 03112119 A | * | 5/1991 |
| JP | 03261123 A | * | 11/1991 |
| JP | 9232196 | | 9/1997 |
| JP | 2000173860 | | 6/2000 |
| JP | 2002075807 A | * | 3/2002 |
| JP | 2007043197 | | 2/2007 |

OTHER PUBLICATIONS

Abstract of Chinese Patent No. CN1217590, May 26, 1999.
Abstract of Japanese Patent No. JP1091411, Apr. 11, 1989.
Abstract of Japanese Patent No. JP1109711, Apr. 26, 1989.
Abstract of Japanese Patent No. JP2130905, May 18, 1990.
Technical Information—*Comparison of Multilayer Ceramic and Tantalum Capacitors*, Jeffrey Cain, AVX Corporation, 6 pages.
Technical Information—*Niobium Oxide Technology Roadmap*, Zednicek et al., AVX Corporation, 6 pages.

* cited by examiner

CAPACITOR ASSEMBLY

CROSS REFERENCE TO RELATED APPLICATIONS

The present application claims filing benefit of U.S. provisional patent application Ser. No. 60/781,633 filed on Mar. 13, 2006, which is hereby incorporated by reference in its entirety.

BACKGROUND OF THE INVENTION

The diversity of modern technical applications creates a need for efficient electronic components and integrated circuits for use therein. Capacitors are a fundamental component used for filtering, decoupling, bypassing and other aspects of such modern applications which may include wireless communications, high-speed processing, networking, circuit switching and many other applications. A dramatic increase in the speed and packing density of integrated circuits requires advancements in decoupling capacitor technology. When high-capacitance decoupling capacitors are subjected to the high frequencies of many present applications, performance characteristics become increasingly more important. Since capacitors are fundamental to such a wide variety of applications, their precision and efficiency is imperative. Many specific aspects of capacitor design have thus been a focus for improving the performance characteristics of capacitors.

A wide variety of conventional capacitors are available on the market today, and each provides a unique combination of performance characteristics well-suited for particular applications. For example, electrolytic capacitors, such as tantalum capacitors, are traditionally employed in applications where a high capacitance value and overall device compactness are required. Multilayer ceramic capacitors (MLCCs) are typically quite effective for frequency filtering applications. It is quite common that these and other particular capacitor types will be used in a single integrated circuit environment. In such instances, the different capacitors may be connected in parallel on a printed circuit board (PCB) as discrete components. This requires a relatively large amount of circuit space and separate mounting pads for each capacitor. As a result, efforts continue to strive for component miniaturization, orientation efficiency and other ways to save space and maximize board real estate in a PCB environment.

It may also be desirable to improve other capacitor performance characteristics, such as ESR (Equivalent Series Resistance), which is the inherent resistance value of a capacitor. Because theoretical capacitors do not actually include any resistance, it is often desirable to create a capacitor with low ESR. The need for minimal ESR is especially evident in decoupling capacitor applications. Increased ESR can increase the ripple voltage and power dissipation for a given capacitance value. This is related to the RC time constant of a capacitor and contributes to the need for low capacitor ESR.

Another capacitor characteristic that may affect circuit applications is piezoelectric noise, which is prevalent in many MLCC applications. Low level piezoelectric noise may be generated when the capacitor ceramics are subjected to alternate voltages, which can cause mechanical vibrations in the capacitor. The inherent nature of the ceramic material converts the mechanical vibrations to generally low-level electrical noise. Significant amounts of piezoelectric noise can have an effect on signal quality, especially in high frequency applications. As such, it is often desirable to reduce piezoelectric noise levels in circuit applications.

Thus, a need currently exists for an integrated capacitor assembly that exhibits a broad range of electrical properties.

SUMMARY OF THE INVENTION

In accordance with one embodiment of the present invention, a capacitor assembly is disclosed. The assembly comprises a multi-anode stack containing at least two electrolytic capacitors positioned adjacent to each other, the capacitors comprising a cathode termination and an anode termination formed by an anode wire. The assembly further comprises a ceramic component comprising a first polarity termination and a second polarity termination. The anode termination and the first polarity termination are electrically connected to a first lead frame portion. Likewise, the cathode termination and the second polarity termination are electrically connected to a second lead frame portion. A case encapsulates the multi-anode stack and the ceramic component, and leaves exposed respective portions of the first and second lead frame portions.

In accordance with another embodiment of the present invention, a method is disclosed for forming a capacitor assembly. The method comprises stacking at least two electrolytic capacitors together in an adjacent relationship to form a multi-anode stack, wherein anode wires of the electrolytic capacitors are positioned in a generally parallel arrangement. The anode wires and a first termination of a multilayer ceramic capacitor are electrically connected to a first terminal. Further, cathode terminations of the electrolytic capacitors and a second termination of the multilayer ceramic capacitor are electrically connected to a second terminal. The multi-anode stack and the multilayer ceramic capacitor are encapsulated within a case.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Repeat use of references characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to an integrated capacitor assembly that offers improved performance characteristics in a convenient and space-saving package. More specifically, the capacitor assembly contains a multi-anode stack of at least two electrolytic capacitors and at least one ceramic component (e.g., multilayer ceramic capacitor), which are connected in parallel to respective common terminals within an encapsulating case. The resultant capacitor assembly is characterized by such performance characteristics as relatively high capacitance, low ESR, low piezoelectric noise, and space reduction. Reduced piezoelectric noise may be particularly advantageous for providing clear filtering in audio/video data processing and communication. Various embodiments of the electrolytic and ceramic components, as well as the particular manner in which they are arranged and connected within the assembly, will now be described in more detail.

I. Electrolytic Capacitor

Figure 1:
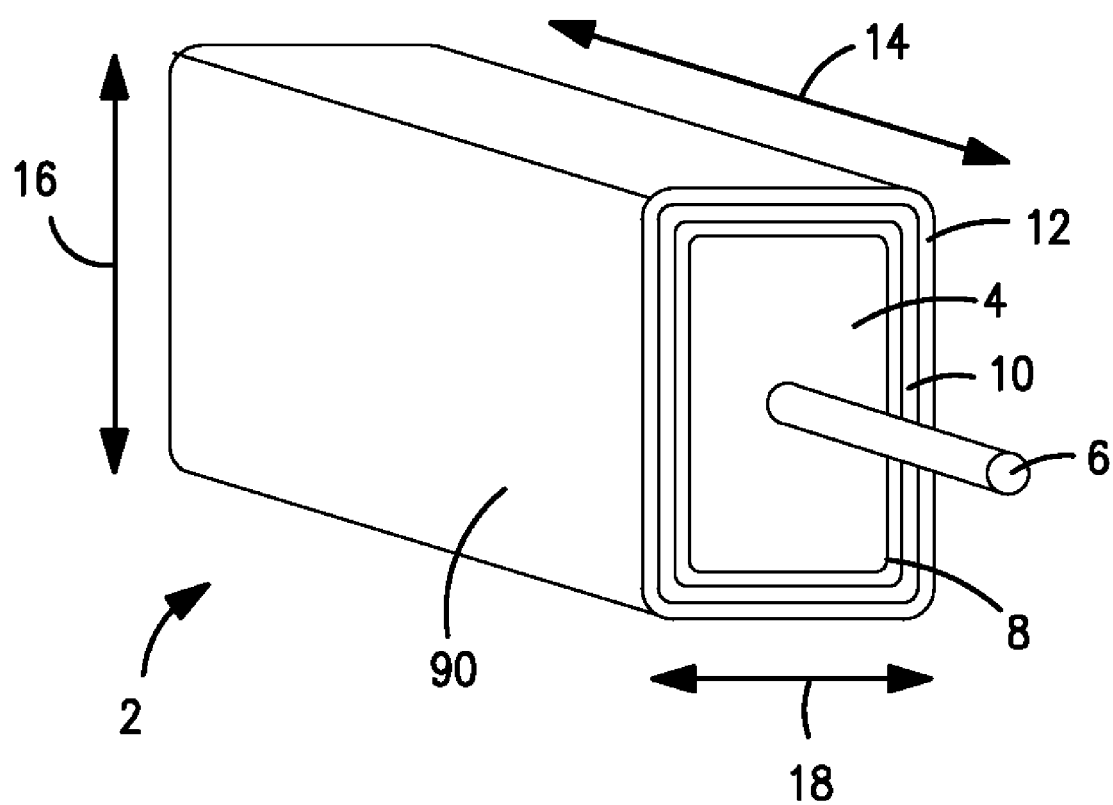
FIG. 1 is a perspective view of one embodiment of an electrolytic capacitor for use in the present invention.

Any of a variety of known electrolytic capacitors may generally be employed in the capacitor assembly of the present invention. Referring to FIG. 1, for instance, one embodiment of a suitable electrolytic capacitor 2 is shown that includes an anode body 4. The anode body 4 may be formed from a powder constituted primarily by a valve metal (i.e., metal that is capable of oxidation) or from a composition that contains the valve metal as a component. Suitable valve metals that may be used include, but are not limited to, tantalum, niobium, aluminum, hafnium, titanium, alloys of these metals, and so forth. For example, the anode body 4 may be formed from a valve metal oxide or nitride (e.g., niobium oxide (e.g., NbO), tantalum oxide, tantalum nitride, niobium nitride, etc.) that is generally considered a semi-conductive or highly conductive material. Examples of such valve metal oxides are described in U.S. Pat. No. 6,322,912 to Fife, which is incorporated herein in its entirety by reference thereto for all purposes. Examples of valve metal nitrides are also described in "Tantalum Nitride: A New Substrate for Solid Electrolytic Capacitors" by T. Tripp; Proceedings of CARTS 2000: 20th Capacitor and Resistor Technology Symposium, 6-20 Mar. 2000. In one particular embodiment, niobium oxide powder may be used that is available from H. C. Starck and has a CV (capacitance/voltage) per unit weight of 80 kCV/g.

A variety of conventional fabricating procedures may generally be utilized to form the anode body 4. In one embodiment, a tantalum or niobium oxide powder having a certain particle size is first selected. The particle size may vary depending on the desired voltage of the resulting capacitor. For example, powders with a relatively large particle size (e.g., about 10 micrometers) are often used to produce high voltage capacitors, while powders with a relatively small particle size (e.g., about 0.5 micrometers) are often used to produce low voltage capacitors. The particles are then optionally mixed with a binder and/or lubricant to ensure that the particles adequately adhere to each other when pressed to form the anode body 4. Suitable binders may include camphor, stearic and other soapy fatty acids, Carbowax (Union Carbide), Glyptal (General Electric), polyvinyl alcohols, napthaline, vegetable wax, and microwaxes (purified paraffins). The binder may be dissolved and dispersed in a solvent. Exemplary solvents may include acetone; methyl isobutyl ketone; trichloromethane; fluorinated hydrocarbons (freon) (DuPont); alcohols; and chlorinated hydrocarbons (carbon tetrachloride). When utilized, the percentage of binders and/or lubricants may vary from about 0.1% to about 8% by weight of the total mass. It should be understood, however, that binders and lubricants are not required in the present invention. Once formed, the powder is compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. As shown, the powder may be compacted around an anode wire 6 (e.g., tantalum wire). It should be further appreciated that the anode wire 6 may alternatively be attached (e.g., welded) to the anode body 4 subsequent to pressing and/or sintering of the anode body.

After compression, any binder/lubricant may be removed by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Thereafter, the pellet is sintered to form a porous, integral mass. For example, in one embodiment, the pellet may be sintered at a temperature of from about 1200° C. to about 2000° C., and in some embodiments, from about 1500° C. to about 1800° C. under vacuum. Upon sintering, the pellet shrinks due to the growth of bonds between the particles. In addition to the techniques described above, any other technique for forming the anode may also be utilized in accordance with the present invention, such as described in U.S. Pat. No. 4,085,435 to Galvagni; U.S. Pat. No. 4,945,452 to Sturmer. et al.; U.S. Pat. No. 5,198,968 to Galvagni; U.S. Pat. No. 5,357,399 to Salisbury; U.S. Pat. No. 5,394,295 to Galvagni, et al.; U.S. Pat. No. 5,495,386 to Kulkarni; and U.S. Pat. No. 6,322,912 to Fife, which are incorporated herein in their entirety by reference thereto for all purposes.

The anode body 4 may be anodized so that a dielectric film 8 is formed over and within the porous anode. Anodization is an electrical chemical process by which the anode metal is oxidized to form a material having a relatively high dielectric constant. For example, a tantalum anode may be anodized to form tantalum pentoxide ($Ta_2O_5$), which has a dielectric constant "k" of about 27. The anode body 4 may be dipped into a weak acid solution (e.g., phosphoric acid) at an elevated temperature (e.g., about 85° C.) that is supplied with a controlled amount of voltage and current to form a tantalum pentoxide coating having a certain thickness. The power supply is initially kept at a constant current until the required formation voltage is reached. Thereafter, the power supply is kept at a constant voltage to ensure that the desired dielectric thickness is formed over the surface of the tantalum pellet. The anodization voltage typically ranges from about 10 to about 200 volts, and in some embodiments, from about 20 to about 100 volts. In addition to being formed on the surface of the anode body 4, a portion of the dielectric oxide film 8 will also typically form on the surfaces of the pores. It should be understood that the dielectric film 8 may be formed from other types of materials and using different techniques.

Once the dielectric film 8 is formed, a protective coating (not shown) may optionally be applied, such as one made of a relatively insulative resinous material (natural or synthetic). Such materials may have a resistivity of greater than about 0.05 ohm-cm, in some embodiments greater than about 5, in some embodiments greater than about 1,000 ohm-cm, in some embodiments greater than about $1 \times 10^5$ ohm-cm, and in some embodiments, greater than about $1 \times 10^{10}$ ohm-cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

The anodized part is thereafter subjected to a step for forming cathodes according to conventional techniques. Referring again to FIG. 1, for instance, a solid electrolytic cathode 10 is formed that overlies the dielectric film 8. The cathode 10 may be formed by pyrolytic decomposition of manganous nitrate ($Mn(NO_3)_2$) to form a manganese dioxide ($MnO_2$) cathode. Such techniques are described, for instance, in U.S. Pat. No. 4,945,452 to Sturmer, et al., which is incorporated herein in its entirety by reference thereto for all purposes. Alternatively, a conductive polymer coating may be used to form the cathode 10 of the electrolytic capacitor 2. The conductive polymer coating may contain one or more conductive polymers, such as polypyrroles; polythiophenes, such as poly(3,4-ethylenedioxy thiophene) (PEDT); polyanilines; polyacetylenes; poly-p-phenylenes; and derivatives thereof. Moreover, if desired, the conductive polymer coating may also be formed from multiple conductive polymer layers. For example, in one embodiment, the conductive polymer coating may contain one layer formed from PEDT and another layer formed from a polypyrrole. Various methods may be utilized to apply the conductive polymer coating onto the anode part. For instance, conventional techniques such as sputtering, screen-printing, dipping, electrophoretic coating, electron beam deposition, spraying, and vacuum deposition, may be used to form a conductive polymer coating. In one embodiment, for example, the monomer(s) used to form the conductive polymer (e.g., PEDT), can initially be mixed with a polymerization catalyst to form a dispersion. For example, one suitable polymerization catalyst is BAYTRON C, which is iron III toluene-sulphonate and n-butanol and sold by Bayer Corporation. BAYTRON C is a commercially available catalyst for BAYTRON M, which is 3,4-ethylene dioxythiophene, a PEDT monomer also sold by Bayer Corporation. In most embodiments, once applied, the conductive polymer is healed. Healing may occur after each application of a conductive polymer layer or may occur after the application of the entire conductive polymer coating. Although various methods have been described above, it should be understood that any other method for applying the cathode layer may also be utilized in the present invention.

Once the solid electrolytic layer is formed, the part may then be applied with a carbon coating (e.g., graphite) and silver coating, respectively. The silver coating may act as a solderable conductor for the capacitor and the carbon coating limits contact of the silver coating with the solid electrolyte. Lead electrodes may then be provided as is well known in the art. Such layer(s) 12 in combination with the cathode 10 forms the cathode termination for the electrolytic capacitor 2, while the anode wire 6 forms the anode termination.

If desired, the size of the electrolytic capacitor may be selected to improve the electrical performance of the capacitor assembly. For example, electrolytic capacitors having a relatively small anode thickness (i.e., "low profile") generally exhibit a greater surface area to volume ratio, which provides a shorter transmission path and thereby minimizes ESR and inductance. Thus, the thickness of the anode may range from about 0.1 to about 10 millimeters, in some embodiments, from about 0.2 to about 5 millimeters, and in some embodiments, from about 0.5 to about 1.5 millimeters. Likewise, the resulting thickness of the electrolytic capacitor (dimension 18 in FIG. 1) may range from about 0.2 to about 20 millimeters, in some embodiments, from about 0.4 to about 10 millimeters, and in some embodiments, from about 1 to about 3 millimeters. Alternatively the anode may be pressed using an appropriately shaped punch and die so as to have a convoluted or trenched surface which, similarly to the thin low profile anode above exhibits a relatively large surface to volume ratio that facilitates lower ESR and extended frequency response of the capacitance.

The properties of the electrolytic capacitor may be selectively controlled to optimize the performance of the resulting capacitor assembly. For example, the electrolytic capacitor may exhibit a low equivalent series resistance (ESR), which refers to the extent that the capacitor acts like a resistor when charging and discharging in an electronic circuit and is usually expressed as a resistance in series with the capacitor. For example, the electrolytic capacitor may have an ESR of less than about 1 ohm, in some embodiments less than about 300 milliohms, in some embodiments less than about 200 milliohms, and in some embodiments, less than about 100 milliohms, measured with a 2-volt bias and 1-volt signal at a frequency of 300 kHz. Likewise, equivalent series inductance ("ESL") values may be less than about 10 nanoHenries ("nH"), and in some embodiments, less than about 1.5 nH. The capacitance of the electrolytic capacitor may also range from about 1 to about 5,000 microFarads, in some embodiments, from about 250 to about 2,500 microFarads, in some embodiments, from about 400 to about 1,000 microFarads.

II. Ceramic Component

Figure 2:
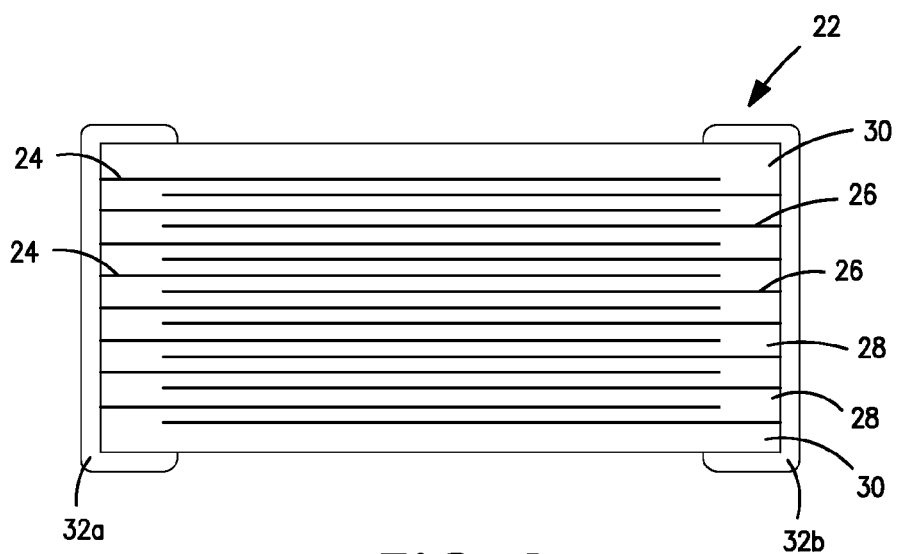
FIG. 2 is a plan cross-sectional view of a multilayer ceramic capacitor (MLCC) for use in one embodiment of the present invention.
Figure 3:
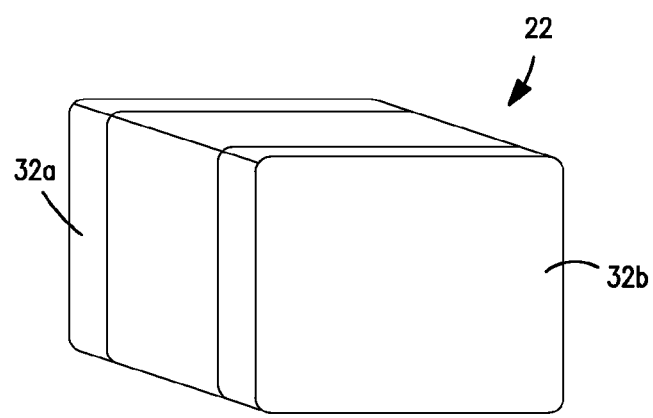
FIG. 3 is a perspective view of a terminated MLCC such as that illustrated in FIG. 2.
Figure 4:
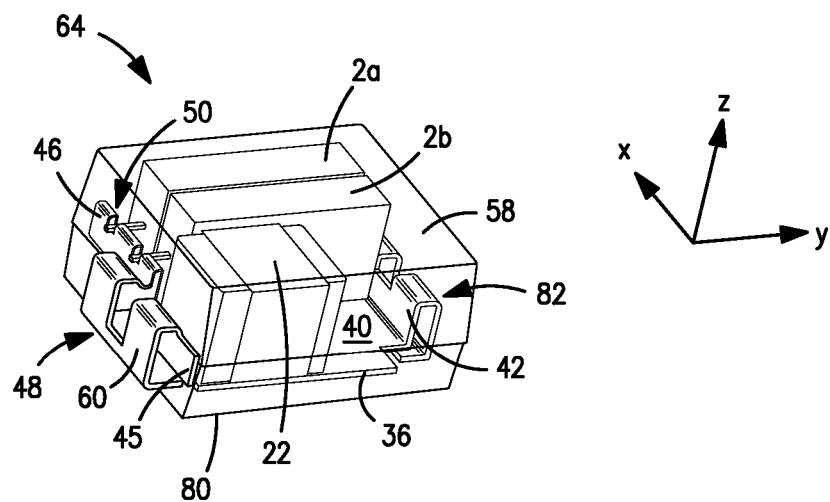
FIG. 4 is a perspective view of one embodiment of a capacitor assembly of the present invention.
Figure 5:
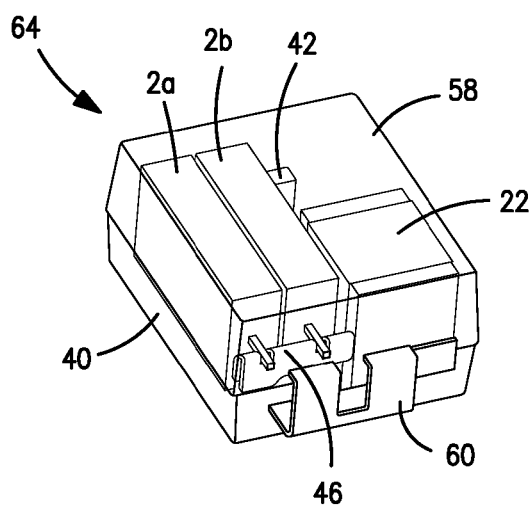
FIG. 5 is a different perspective view of the capacitor assembly of FIG. 4.
Figure 6:
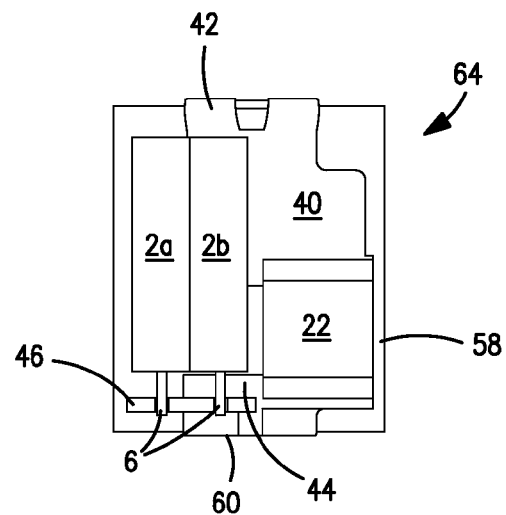
FIG. 6 is a plan view of the capacitor assembly of FIG. 4.

The ceramic component may be any known electrical components that employs one ore more ceramic layers, such as capacitors (single- or multilayer), varistors, and so forth. Such ceramic components typically contain a ceramic body having a two or more electrode layers separated by at least one ceramic layer. Referring to FIGS. 2-3, for instance, one embodiment of a multilayer ceramic capacitor ("MLCC") is shown that contains a plurality of first electrode layers 24 and second electrode layers 26 interleaved with a plurality of ceramic layers 28. Adjacent pairs of first electrode layers 24 and second electrode layers 26 form opposing parallel capacitor plates. Dielectric cover layers 30 are also provided before peripheral terminations 32a and 32b are formed on the MLCC. At least one first peripheral termination 32a electrically connects to each first electrode layer 24, while at least one second peripheral termination 32b electrically connects to each second electrode layer 26. A perspective view of a finished MLCC after termination is illustrated in FIG. 3.

As is known in the art, the ceramic layers 28 may be characterized by the nature of the ceramic employed, such as X5R, X7S, X7R, Y5V, etc. Examples of suitable substances for forming the ceramic layers 28 include, but are not limited to $PbZrTiO_3$ (also referred to as PZT), PNZT, PLZT, $PbMg_{1/3}Nb_{2/3}O_3$—$PbTiO_3$ (also referred to as PMN-PT), $SrBaTiO_3$, $BaTiO_3$, $SrTiO_3$, $Bi_2SrTa_2O_9$, polycrystalline ceramic perovskites, polycrystalline relaxor ferroelectric ceramic oxides, silicon dioxide, $Si_3N_4$, silicon oxynitride, $Al_2O_3$, $Ta_2O_5$, polycrystalline tungsten bronzes, polycrystalline bismuth titanates, ZnO, and other suitable dielectric materials. The electrode layers 24 and 26 may be formed from copper, nickel, aluminum, palladium, gold, silver, platinum, lead, tin, alloys of these materials, or any other suitable conductive substance. Terminations 32a and 32b may also include one or more layers of conductive materials. In one embodiment, multilayer terminations are employed that include a first layer of copper, a second solder-barrier layer of nickel, and a third layer corresponding to one or more of Ni, Ni/Cr, Ag, Pd, Sn, Pb/Sn, alloys of these materials or other suitable plated solder.

It should be understood that the description above also applied to other types of ceramic components, such as varistors. Varistors typically provide a high resistance (and a degree of capacitance) when voltages impressed on the electronic circuit are maintained below a predetermined threshold voltage, and a low resistance shunt when voltages exceed the threshold. The varistor may, for instance, contain a ceramic body based on a metal-oxide (e.g., zinc oxide), such as multilayer ZnO voltage suppressors available from AVX Corp. under the designation Transguard®.

The properties of the ceramic component may be selectively controlled to optimize the performance of the resulting capacitor assembly. For example, a ceramic capacitor may exhibit a low equivalent series resistance (ESR), such as less than about 100 milliohms, in some embodiments less than about 50 milliohms, and in some embodiments, less than about 10 milliohms, measured with a 2-volt bias and 1-volt signal at a frequency of 300 kHz. Likewise, ESL values may be less than about 1 nH in some embodiments, and in some embodiments, less than about 0.1 nH. The capacitance of the ceramic capacitor may also range from about 0.1 to about 1,000 microFarads, in some embodiments, from about 10 to about 500 microFarads, in some embodiments, from about 50 to about 200 microFarads.

III. Capacitor Assembly

As stated above, the electrolytic and ceramic components are connected in parallel to common terminations in accordance with the present invention. Any number of electrolytic and/or ceramic components may be employed in the present invention, such as from 1 to 8 electrolytic capacitors and from 1 to 8 ceramic components. In one particular embodiment, two electrolytic capacitors are used in conjunction with one ceramic component. Regardless, the capacitor assembly contains an anode lead frame portion to which the anode termination (e.g., wire) of at least one electrolytic capacitor is electrically connected and a cathode lead frame portion to which the cathode termination of the electrolytic capacitor is electrically connected. Likewise, a polarity termination of at least one ceramic component is electrically connected to the anode lead frame portion and another polarity termination is electrically connected to the cathode lead frame portion. The capacitor assembly also contains a case that encapsulates the individual components, but nevertheless leaves respective portions of the first and second lead frame portions exposed to form surface mounting terminations for circuit applications.

Referring to FIGS. 4-6 and 10-13, one particular embodiment of a capacitor assembly 64 of the present invention is shown and will now be described in more detail. The capacitor assembly 64 includes one ceramic capacitor 22 in electrical communication with two electrolytic capacitors 2a and 2b. In this embodiment, the electrolytic capacitors 2a and 2b have a generally rectangular prismatic shape and are stacked so that the surfaces having the largest areas are positioned adjacent to each other to increase the volumetric efficiency of the assembly 64. That is, as shown in FIG. 1, the surface 90 of the electrolytic capacitor 2a defined by its width (dimension 16) and length (dimension 14) may be placed adjacent to a corresponding surface (not shown in FIG. 1) of the electrolytic capacitor 2b. The capacitors 2a and 2b may be stacked in a vertical configuration, wherein the surface 90 is provided in a plane that is substantially perpendicular to the -x and/or -y directions (FIG. 4), as well as in a horizontal configuration, wherein the surface 90 is provided in a plane that is substantially perpendicular to the -z direction. In the embodiment depicted, for example, the capacitors 2a and 2b are vertically stacked in a plane perpendicular to the -x direction. It should understood that each capacitors 2a and 2b need not extend in the same direction. For example, the surface 90 of the capacitor 2a may be provided in a plane that is substantially perpendicular to the -x direction, while the corresponding surface of the capacitor 2b is provided in a plane that is substantially perpendicular to the -y direction. Desirably, however, both capacitors 2a and 2b extend in substantially the same direction.

Any of a variety of techniques may be used to connect the electrolytic capacitors into a multi-anode stack configuration, such as laser welding, soldering, conductive adhesives, etc. In one embodiment, for instance, the anode wires are initially cut from a stainless steel transport strip. One electrolytic capacitor is then positioned in a fixed location (e.g., into a location comb) and applied with a conductive adhesive. One suitable adhesive may be a silver-loaded epoxy (SLE) adhesive (e.g., Amicon CE 3513). The other capacitor is then affixed to the adhesive-coated capacitor so that the anode wires are substantially parallel and facing the same side. In this manner, the respective anode wires are placed in a close adjacent relationship, which may improve the efficiency by which the wires may be welded to a leadframe. This process may be repeated when it is desired to form a multi-anode stack of more than two electrolytic capacitors. The stacked block of electrolytic capacitors may subsequently be fired in an oven to cure the SLE adhesive.

Regardless of the arrangement selected, the electrolytic capacitors 2a and 2b and the ceramic capacitor 22 are connected to common electrical terminations to form the capacitor assembly 64. For example, the capacitor assembly 64 contains an anode lead frame portion 48 formed from a first anode portion 46, second anode portion 45, and third anode portion 60. Both the third anode portion 60 and the first anode portion 46 are provided in a plane that is generally perpendicular to the bottom surface 80 (FIG. 4) of the capacitor assembly 64. The first anode portion 46 also possesses two separate U-shaped regions 50 that receive and are electrically connected to the anode wires 6 of the electrolytic capacitors 2a and 2b. The U-shaped regions 50 may enhance the surface contact and mechanical stability of the wires 6 when connected thereto. When configured in the manner described above, the first anode portion 46 may be readily connected to the electrolytic capacitors 2a and 2b in an efficient, yet effective manner.

The second anode portion 45 is electrically connected to the termination 32a of the ceramic capacitor 22. In the illustrated embodiment, for instance, the second anode portion 45 contains a mounting surface 44 (FIG. 13) and a sidewall 38 (FIG. 13) that together receive the ceramic capacitor 22. The mounting surface 44 is substantially parallel to the bottom surface 80 of the capacitor assembly 64 and receives the bottom surface of the termination 32a. The sidewall 38 is substantially perpendicular to the bottom surface 80 of the capacitor assembly 64 and contacts a side surface of the termination 32a. In this manner, the second anode portion 45 provides a pocket-like configuration, which may provide a variety of benefits to the resulting capacitor assembly. For instance, this configuration may help stabilize the ceramic capacitor 22 and thus reduce piezoelectric noise. The capacitor assembly may, for example, exhibit a piezoelectric noise having an absolute value of less than about 1 mV, in some embodiments less than about 0.5 mV, and in some embodiments, less than about 0.1 mV is achieved, as measured at an acceleration force of 15 G, power supply of 2.5 volts, and frequency of 10 kHz.

The capacitor assembly 64 also contains a cathode lead frame portion 82, which is formed from a mounting surface 40 and sidewall 42. Although generally larger than the mounting surface 44, the mounting surface 40 is also provided in a plane that is generally parallel to the bottom surface 80 of the capacitor assembly 64. The cathode termination (e.g., bottom surface) of both the electrolytic capacitors 2a and 2b, as well as the termination 32b (e.g., bottom surface) of the ceramic capacitor 22, are electrically connected to the mounting surface 44. The sidewall 42 is provided in a plane that is generally perpendicular to the bottom surface 80 of the capacitor assembly 64. Although not necessarily required, the sidewall 42 is electrically connected to the cathode termination (e.g., side) of at least one of the electrolytic capacitors 2a and/or 2b.

Figure 10:
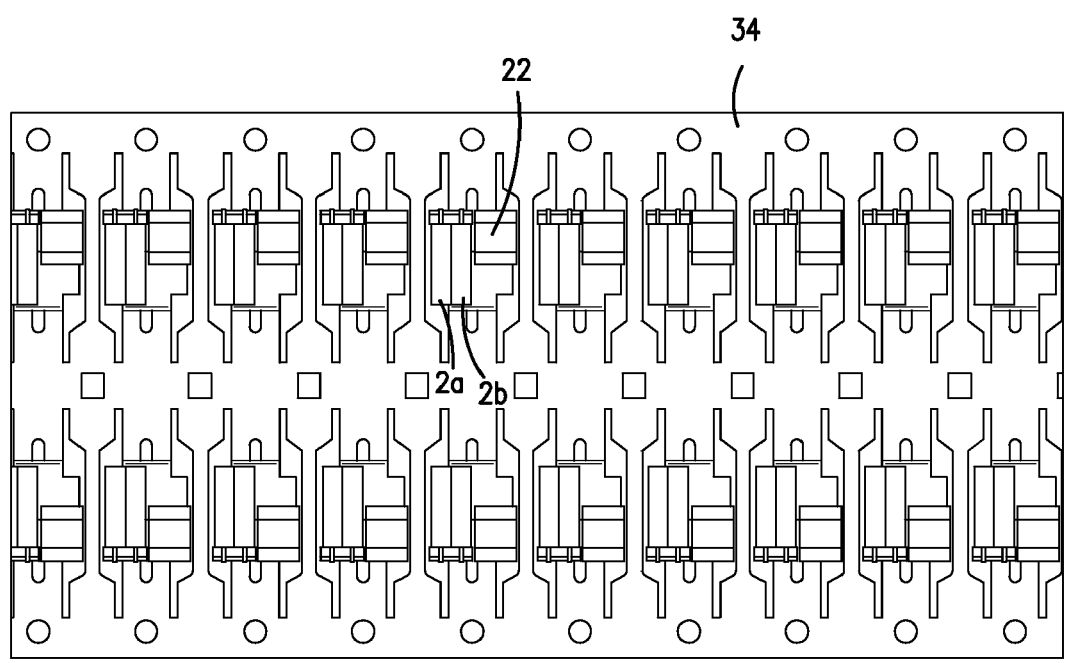
FIG. 10 is a plan view of one embodiment of a termination frame for use in forming multiple capacitor assemblies.

One embodiment of a technique for forming the capacitor assembly 64 shown in FIGS. 4-6 and 10-13 will now be described in more detail. In this regard, the electrolytic and ceramic capacitors are initially attached to a lead frame in the desired configuration (e.g., horizontal, vertical, etc.). Referring to FIG. 10, a termination frame 34 may be utilized to form multiple capacitor assemblies. In one embodiment, termination frame 34 is formed of copper or copper alloy, although other conductive materials may also be utilized. If desired, the surface of the termination frame 34 may also be electroplated as is known in the art to ensure that the final part is mountable onto the circuit board. For example, the frame 34 may be electroplated with nickel, silver, gold, etc. In one particular embodiment, the termination frame 34 is plated with nickel and silver flashes and a solder layer. Alternatively, the frame 34 is plated with nickel and gold flashes and a hard gold layer. One exemplary termination frame 34 system, including plating layers, is available from Batten & Allen (United Kingdom). Regardless of the manner in which it is formed, dedicated portions of the termination frame 34 are configured for receiving the two stacked electrolytic capacitors 2a and 2b, as well as the ceramic capacitor 22. When multiple capacitor assemblies are manufactured in bulk, as represented in FIG. 10, the termination frame 34 may be cut into individual assemblies after the capacitors are attached to the frame. An exemplary manner in which such capacitors are attached to termination frame will be described for sake of simplicity with reference to a single capacitor assembly.

Figure 11:
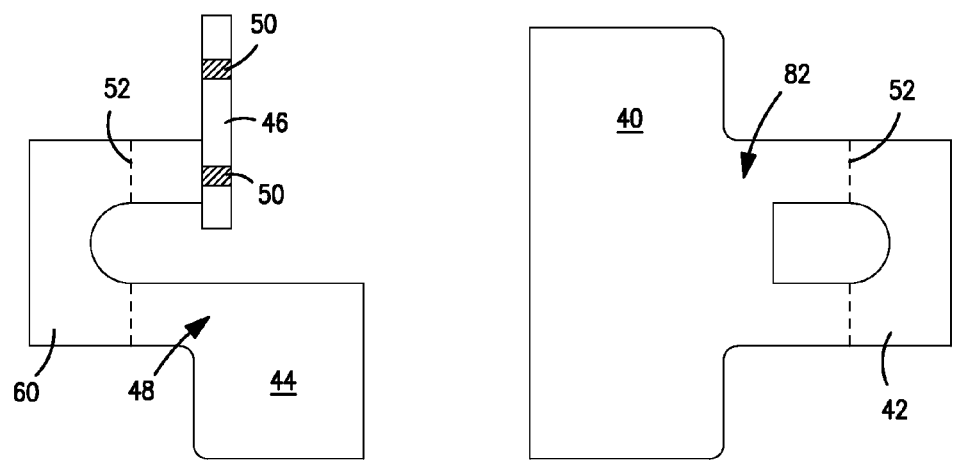
FIG. 11 is a plan view of exemplary first and second lead frame portions for a capacitor assembly of the present invention.
Figure 12:
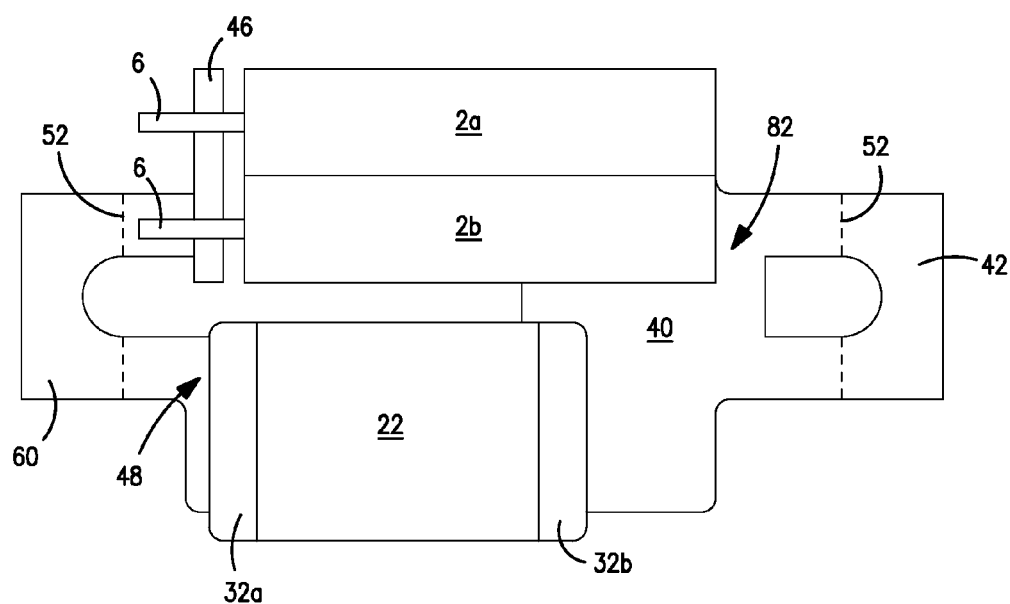
FIG. 12 is a plan view of the first and second lead frame portions of FIG. 11 to which a multi-anode capacitor stack and a ceramic capacitor are adhered.
Figure 13:
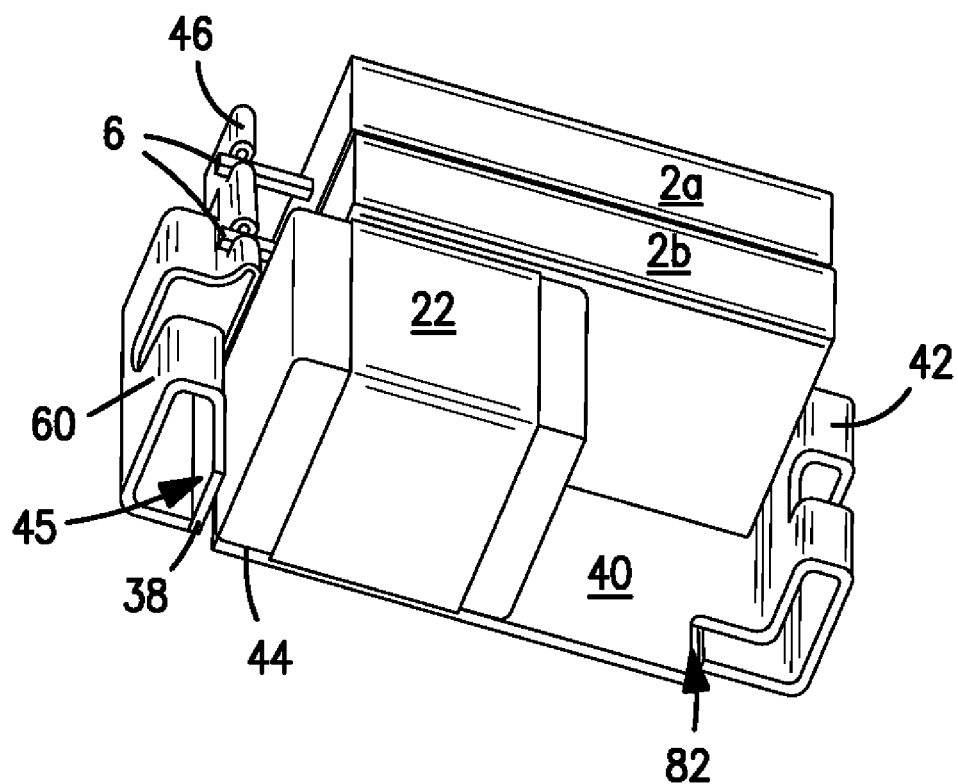
FIG. 13 is a perspective view of the capacitor assembly of FIGS. 4-6, illustrated without an encapsulating case.

FIGS. 11-12 are plan views illustrating portions of termination frame 34 for use in a single capacitor assembly. As shown, the termination frame 34 contains the anode lead frame portion 48, which contains the mounting surface 44 and an extended sidewall portion 60. The termination frame 34 also includes the cathode lead frame portion 82, which contains the mounting surface 40 and an extended sidewall portion 42. The extended portions 42 and 60 will eventually be bent at approximately 90° angles along dotted lines 52 along the outer periphery of an encapsulating case 58 (FIGS. 4-6) to form first and second U-shaped terminations for the capacitor assembly 64.

The manner in which the respective lead frame portions are connected to the electrolytic and ceramic capacitors may generally vary as is well known in the art. Suitable techniques include, for instance, laser welding, soldering, conductive adhesives, etc. In one embodiment, for example, the ceramic capacitor 22 may be mounted to the lead frame portions after application of a solder paste onto the mounting surfaces 40 and 44. An exemplary solder paste is available from Cobar Europe BV under the designation "COBAR 325." For example, the ceramic capacitor 22 may be applied to the pasted areas of the mounting surfaces 40 and 44 and then pressed. The leadframe may then be reflowed in an oven under an appropriate reflow profile recommended for the particular solder adhesive paste. The lead frame may also be washed with a cleaning solution and subsequently dried to remove flux. In one embodiment, the ceramic capacitor 22 and termination frame 34 are washed in cleaning solution (e.g., Vigon A200) to remove flux. The cleaning solution is then removed with water and thereafter washed with demi-water having a conductivity below 6 µS. To connect the electrolytic capacitors 2a and 2b, the anode wires 6 may be initially positioned within the respective U-shape regions 50. The cathode terminations of the capacitors 2a and 2b are adhered to the mounting surface 40 using a conductive adhesive (e.g., SLE adhesive), which is applied to mounting surface 40. Thereafter, the anode wires 6 are laser-welded to the second portion 46. After the laser welding step, the lead frame may be placed into a heated chamber at an appropriate temperature for curing the adhesive (e.g., about 205° C. for 45 seconds when for an Amicon CE 3513 adhesive), while optionally pressing the electrolytic capacitors 2a and 2b to the lead frame.

Once the capacitors are attached, the lead frame is enclosed within a resin casing, such as a "V case" (AVX Corporation), which may then be filled with silica or any other known encapsulating material. The resulting encapsulated case 58 provides additional structural and thermal protection for the capacitor assembly. After encapsulation, the extended portions 60 and 42 of the respective anode and cathode lead frame portions 48 and 82 are trimmed and bent along the outside of the casing. In this manner, the portions 60 and 42 form U-shaped terminations for the finished capacitor assembly 64.

Thus, as a result of the present invention, a capacitor assembly may be formed that exhibits excellent electrical properties. For example, the equivalent series resistance of the capacitor assembly may be less than about 50 milliohms, in some embodiments less than about 20 milliohms, and in some embodiments, less than about 10 milliohms, measured with a 2-volt bias and 1-volt signal at a frequency of 300 kHz. It is also believed that the dissipation factor (DF) of the capacitor assembly may also be maintained at relatively low levels. The dissipation factor (DF) generally refers to losses that occur in the capacitor assembly and is usually expressed as a percentage of the ideal performance. For example, the dissipation factor of a capacitor assembly of the present invention is typically less than about 15%, and in some embodiments, less than about 10%. Likewise, the capacitance of the assembly may range from about 100 to about 5,000 µF, in some embodiments from about 200 to about 1,000 µF, and in some embodiments, from about 400 to about 800 µF, as measured at 120 Hz.

The present invention may be better understood by reference to the following examples.

TEST PROCEDURES

Piezoelectric Noise:

Piezoelectric noise is generally determined in accordance with ISO 17025 testing standards. For example, a capacitor assembly is soldered to a printed circuit board, which is clamped via a holder to a vibration table. The vibration table is used to subject the capacitor assembly to high levels of mechanical stress/strain to determine how much transduction will occur within the ceramics from the mechanical forces to an electrical noise signal. The vibration table is connected to a signal source through an acceleration sensor that measures force application in terms of gravitational constant G. For example, the vibration table may be configured to subject the capacitor assembly to 15 G. The capacitor assembly is electrically connected to a power supply at DC rated voltage (e.g., 2.5V). Vibration from the table creates an alternate piezo-voltage signal in the capacitor assembly, which is measured on a resistor connected in series with the capacitor assembly. The signal frequency was set in the example below so that a maximum piezo-voltage signal of 10 kHz was achieved.

Equivalent Series Resistance (ESR) and Impedance:

Equivalence series resistance and impedance were measured using an Agilent 4284A Precision LCR meter with Agilent 16089B Kelvin Leads with 2 volts bias and 1 volt signal. The operating frequencies ranged from 0.1 to 1000 kHz.

Capacitance and Dissipation Factor:

Capacitance and Dissipation Factor were measured using an Agilent 4284A Precision LCR meter with Agilent 16089B Kelvin Leads with 2 volts bias and 1 volt signal. The operating frequency was 120 Hz.

EXAMPLE

Capacitor assemblies were constructed as described above and shown in FIGS. 4-6 and 10-13. Each capacitor assembly employed niobium oxide capacitors having part number "NOJY227M002" (AVX Corp.). Each of the niobium oxide capacitors had a length of about 4.95 millimeters, a width of 2.6 millimeters, and a thickness of 1.15 millimeters. Each capacitor assembly also employed a ceramic capacitor having part number "CM32X5R107M04AB" (1210 size) (Kyocera), which was made using an X5R dielectric, rated at 100 microFarads (µF) and 4V. The components were encapsulated using a "V case" having a length of about 7.3 mm, a width of about 6.1 mm, and a height of about 3.45 mm.

Figure 7:
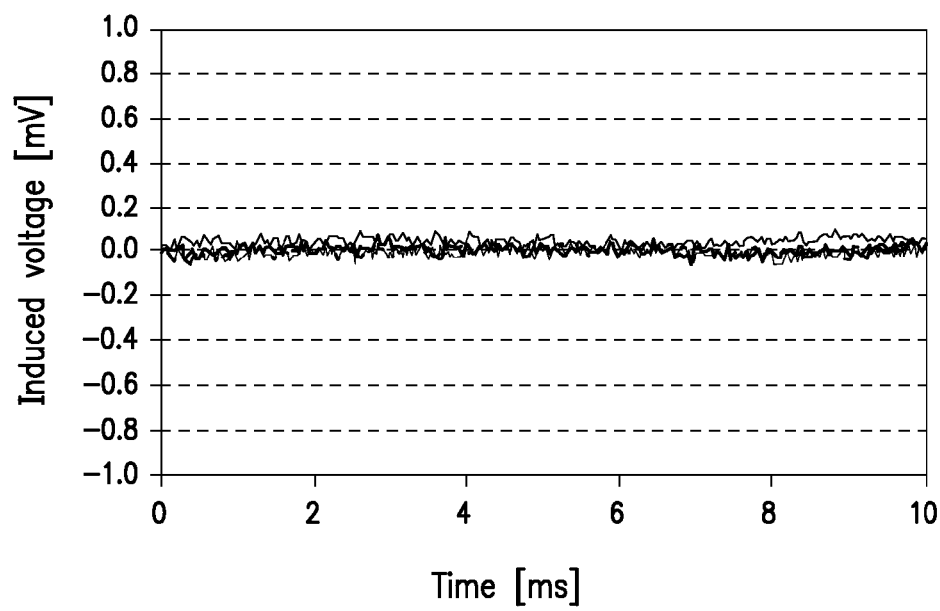
FIG. 7 displays graphical results for a piezoelectric noise test simulation of a capacitor assembly formed in the Example, specifically displaying the induced voltage level versus time.
Figure 8:
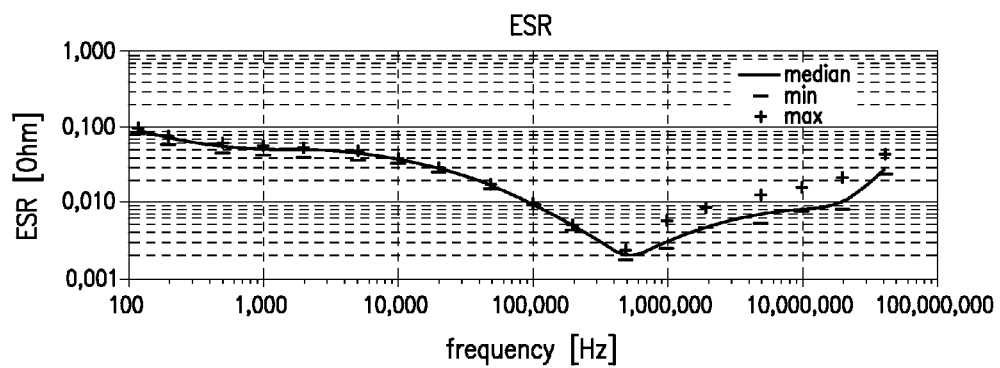
FIG. 8 displays the ESR versus frequency for a capacitor assembly formed in the Example.
Figure 9:
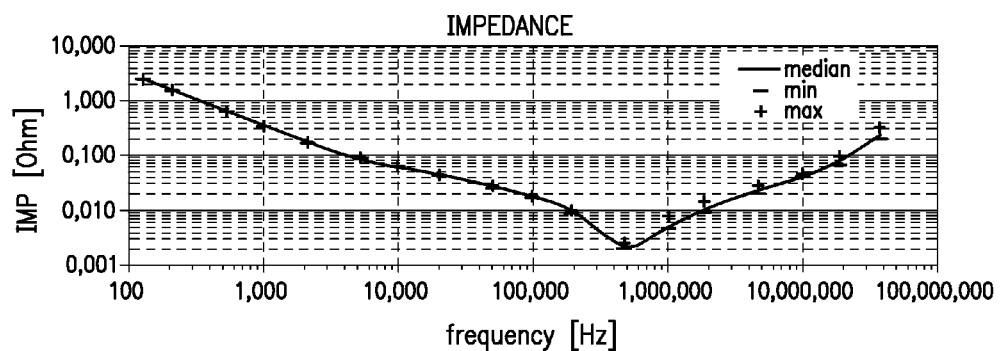
FIG. 9 displays impedance versus frequency for a capacitor assembly formed in the Example.

The samples were tested for their electrical performance as indicated above, and the results for one of the samples are shown in FIGS. 7-9. FIG. 7, for instance, shows the piezoelectric noise (induced voltage levels) over time for one of the capacitor assemblies. As shown, the noise remained relatively low, i.e., an absolute value of less than about 0.1 mV. The capacitance was measured at between about 545 and 560 µF at a test frequency of about 120 Hz. The ESR was measured at between about 2.2 and 3.0 mΩ at a test frequency of about 300 kHz. In addition, the dissipation factor (DF) was measured at levels of between about 3.4% and 6.0%. A graphical illustration of the ESR in milliohms versus frequency is provided in FIG. 8, while overall device impedance versus frequency for the same assembly is provided in FIG. 9.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A capacitor assembly comprising:
    a multi-anode stack comprising at least two electrolytic capacitors positioned adjacent to each other, the capacitors comprising a cathode termination and an anode termination formed by an anode wire;
    a ceramic component comprising a first polarity termination and a second polarity termination;
    a first lead frame portion to which the anode termination and the first polarity termination are electrically connected, wherein the first lead frame portion contains a first anode portion that defines a pocket for receiving the ceramic component;
    a second lead frame portion to which the cathode termination and the second polarity termination are electrically connected; and
    a case that encapsulates the electrolytic capacitors and the ceramic component, and leaves exposed respective portions of the first and second lead frame portions.

2. The capacitor assembly of claim 1, wherein the electrolytic capacitors are electrically connected.

3. The capacitor assembly of claim 1, wherein the electrolytic capacitors are electrically connected with a conductive adhesive.

4. The capacitor assembly of claim 1, wherein the electrolytic capacitors are stacked in a horizontal configuration.

5. The capacitor assembly of claim 1, wherein the electrolytic capacitors are stacked in a vertical configuration.

6. The capacitor assembly of claim 1, wherein the first lead frame portion contains a mounting surface to which the first polarity termination is electrically connected.

7. The capacitor assembly of claim 1, wherein the first lead frame portion also contains a second anode portion that is substantially perpendicular to a bottom surface of the capacitor assembly and to which the anode wire of the electrolytic capacitors is electrically connected.

8. The capacitor assembly of claim 7, wherein the second anode portion defines a U-shaped region within which the anode wire is received.

9. The capacitor assembly of claim 1, wherein the pocket is formed by a mounting surface that is substantially parallel to a bottom surface of the capacitor assembly and a sidewall that is substantially perpendicular to the bottom surface of the capacitor assembly.

10. The capacitor assembly of claim 1, wherein the second lead frame portion contains a mounting surface to which the multi-anode stack and the second polarity termination of the ceramic component are electrically connected.

11. The capacitor assembly of claim 1, wherein the electrolytic capacitors contain an anode body formed from a valve metal composition.

12. The capacitor assembly of claim 11, wherein the valve metal composition includes tantalum.

13. The capacitor assembly of claim 11, wherein the valve metal composition includes niobium oxide.

14. The capacitor assembly of claim 11, wherein the electrolytic capacitors further contain a dielectric film overlying the anode body and a solid electrolyte overlying the dielectric film.

15. The capacitor assembly of claim 14, wherein the solid electrolyte is manganese dioxide.

16. The capacitor assembly of claim 14, wherein the solid electrolyte is a conductive polymer.

17. The capacitor assembly of claim 1, wherein the ceramic component contains a plurality of conductive layers of respective first and second polarities interleaved with a plurality of ceramic layers to form respective pairs of opposing capacitor plates in a stacked arrangement, wherein the first polarity conductive layers are electrically connected to the first polarity termination of the ceramic component, and wherein the second polarity conductive layers are electrically connected to the second polarity termination of the ceramic component.

18. The capacitor assembly of claim 17, wherein the ceramic layers comprise $BaTiO_3$.

19. The capacitor assembly of claim 17, wherein the ceramic component is a multilayer ceramic capacitor.

20. The capacitor assembly of claim 17, wherein the ceramic component is a varistor.

21. The capacitor assembly of claim 1, wherein the capacitor assembly exhibits a piezoelectric noise having an absolute value of less than about 1 millivolt when subjected to a rated voltage level and measured at 15 G.

22. The capacitor assembly of claim 1, wherein the capacitor assembly exhibits a piezoelectric noise having an absolute value of less than about 0.1 millivolt when subjected to a rated voltage level and measured at 15 G.

23. The capacitor assembly of claim 1, wherein the ESR of the assembly is less than about 50 milliohms at an operating frequency of 300 kHz.

24. The capacitor assembly of claim 1, wherein the ESR of the assembly is less than about 10 milliohms at an operating frequency of 300 kHz.

* * * * *